United States Patent
Wu et al.

(10) Patent No.: US 11,545,840 B2
(45) Date of Patent: Jan. 3, 2023

(54) SYSTEM OF BALANCING BATTERY PACK WITH SINGLE CHARGER AND METHOD OF CHARGING THEREOF

(71) Applicants: ABOVE PYRAMID TECHNOLOGY CO., LTD., Taipei (TW); Yung Chun Wu, Taoyuan (TW)

(72) Inventors: Yung Chun Wu, Taoyuan (TW); Chih Chung Tao, Taipei (TW)

(73) Assignees: ABOVE PYRAMID TECHNOLOGY CO., LTD., Taipei (TW); Yung Chun Wu, Taoyuan (TW)

( * ) Notice: Subject to any disclaimer, the term of this patent is extended or adjusted under 35 U.S.C. 154(b) by 16 days.

(21) Appl. No.: 17/356,013

(22) Filed: Jun. 23, 2021

(65) Prior Publication Data

US 2021/0408805 A1    Dec. 30, 2021

(30) Foreign Application Priority Data

Jun. 24, 2020 (TW) .................................. 109121698

(51) Int. Cl.
*H02J 7/00* (2006.01)
*H02J 7/02* (2016.01)

(52) U.S. Cl.
CPC ........ *H02J 7/0014* (2013.01); *H02J 7/00032* (2020.01); *H02J 7/0045* (2013.01); *H02J 7/0047* (2013.01); *H02J 7/02* (2013.01)

(58) Field of Classification Search
CPC .......... H02J 7/0047; H02J 7/02; H02J 7/0045; H02J 7/0014; H02J 7/00032; H02J 7/005
See application file for complete search history.

(56) References Cited

U.S. PATENT DOCUMENTS

| | | | | |
|---|---|---|---|---|
| 11,084,391 | B2* | 8/2021 | Rasmussen | B60L 50/64 |
| 2011/0241623 | A1* | 10/2011 | Wade | H02J 7/0018 320/119 |
| 2017/0104350 | A1* | 4/2017 | Luerkens | H01M 10/441 |
| 2019/0199106 | A1* | 6/2019 | Grasshoff | H02J 7/0019 |
| 2021/0351597 | A1* | 11/2021 | Yang | H05K 7/1492 |

* cited by examiner

*Primary Examiner* — Richard Isla
*Assistant Examiner* — Sadia Kousar
(74) *Attorney, Agent, or Firm* — Sinorica LLC (57) ABSTRACT

A system of charging a battery pack with single charger includes a battery module, a main charging module, and a balance charging module. The battery module has a battery pack, and the battery pack has a plurality of cells in series. The main charging module has a main charger. The balance charging module has a balance charger. All the cells of the battery pack of the battery module are charged at the same time by the main charger of the main charging module. After the charging task of the main charging module is completed, the cells of the battery pack of the battery module are charged in sequence by the balance charger of the balance charging module.

3 Claims, 3 Drawing Sheets

SYSTEM OF BALANCING BATTERY PACK WITH SINGLE CHARGER AND METHOD OF CHARGING THEREOF

BACKGROUND OF THE INVENTION

1. Technical Field

The present invention relates to a system of charging and discharging batteries, and more particularly to a system of balancing a battery pack with single charger and a method of charging the battery pack.

2. Description of Related Art

Batteries are the most important part for an electric vehicle. The properties of batteries, including capacity, safety, endurance, and time of charging, are the facts of consideration whether the batteries are qualified for the electric vehicle. However, time of charging is an unsolved problem until now. A conventional method is to charge the batteries with high current. But high current is harmful to the batteries, so that this is not a good solution.

Recently, the electric vehicle driven by small capacity and low voltage batteries, such as electric scooter, golf cart, airport electric buggy, farm wagon, and forklift truck, uses replaceable batteries to shorten the time of waiting for a full battery.

The replaceable batteries are needed to be moved from one place to another, so they usually have following properties, including low voltage (few cells in series), small volume, and light weight. However, the properties of the cells in the switchable battery, such as charged power, corresponding voltage, and capacity curve, cannot keep the same after several times of charging and discharging, although they are the same when the battery is new. As a result, the batteries cannot be charged to full and cannot discharge when the batteries are not empty, which may shorten the endurance of the batteries.

BRIEF SUMMARY OF THE INVENTION

In view of the above, the primary objective of the present invention is to provide a system and a method of charging a battery pack, which may fix the problem of the conventional device as described above.

In order to achieve the objective of the present invention, a system of charging a battery pack includes a battery module electrically connected to a main charging module and a balance charging module. The battery module includes a battery pack, a battery management system, a cell socket, and a battery main socket. The battery pack has a plurality of cells in series, a main positive electrode, and a main negative electrode. Each of the cells has two electrodes. The battery management system has a battery communication port and a battery status port. The battery management system is electrically connected to the electrodes of the cells of the battery pack through a plurality of cell voltage sampling lines. The cell socket includes a plurality of cell terminals, a battery communication terminal, and a battery status terminal. The cell terminals of the cell socket are electrically connected to the electrodes of the cells of the battery pack respectively. The battery main socket has a main positive terminal and a main negative terminal, and the main positive terminal and the main negative terminal of the battery main socket are electrically connected to the main positive electrode and the main negative electrode of the battery pack respectively. The battery main socket further has a battery communication terminal and a battery status terminal. The battery communication terminal of the cell socket and the battery communication terminal of the battery main socket are electrically connected to the battery communication port of the battery management system. The battery status terminal of the cell socket and the battery status terminal of the battery main socket are electrically connected to the battery status port of the battery management system. The main charging module includes a main charger, a main charging microcontroller, a main charging plug, and a main charging AC connector. The main charger has a main charging positive electrode and a main charging negative electrode. The main charging microcontroller has a main charging communication port, a main charging battery status port, and a balance start output terminal. The main charging plug has a main charging positive terminal, a main charging negative terminal, a main charging communication terminal, and a main charging battery status terminal. The main charging positive terminal of the main charging plug is electrically connected to the main charging positive electrode of the main charger, and the main charging negative terminal of the main charging plug is electrically connected to the main charging negative electrode of the main charger. The main charging communication terminal of the main charging plug is electrically connected to the main charging communication port of the main charger, and the main charging battery status terminal of the main charging plug is electrically connected to the main charging battery status port of the main charger. The main charging AC connector is to connected a power source to supply the main charger and the main charging microcontroller with power. The main charging positive terminal, the main charging negative terminal, the main charging communication terminal, and the main charging battery status terminal of the main charging plug are electrically connected to the main positive terminal, the battery communication terminal, and the battery status terminal of the battery main socket respectively. The balance charging module including a balance charger, a balance charging controller, a relay set, a plurality of cell charging lines, and a balance charging plug. The balance charging plug has a plurality of cell charging terminals, a balance charging communication terminal, and a balance charging battery status terminal. The relay set has a plurality of relays with relay contacts. The cell charging terminals of the balance charging plug are electrically connected to the relay contacts respectively. The balance charger has a balance charging positive electrode, a balance charging negative electrode, a balance charging signal input port, a balance charging control port, a working voltage source, a working voltage output port, and a working voltage switch. The balance charging positive electrode and the balance charging negative electrode are electrically connected to two of the relay contacts. The balance charging signal input port is electrically connected to the balance start output terminal of the main charging microcontroller. The working voltage source and the working voltage output port are electrically connected to the working voltage switch. The balance charging controller has a balance charging microcontroller, a relay driving signal set, and a cell balance charging status display set. The balance charging microcontroller is electrically connected to the relay driving signal set and the cell balance charging status display set. The balance charging microcontroller has a working voltage input port, which is electrically connected to the working voltage output port of the balance charger. The balance charging microcontroller further has a balance charging control port, which is electrically connected to the balance charging control port of the balance charger. The balance charging microcontroller further has a balance charging battery status port and a balance charging communication port, which are electrically connected to the balance charging battery status port and the balance charging communication port of the balance charging plug respectively.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

The present invention provides a charging method which applies a balance charger to charge the cells in sequence to achieve the function of absolute balance in a condition of after the main charger completes the charging task (with high current) or the charging task without any main charger. A specified battery module, a main charging module, and a balance charging module are applied in the charging method. The detail description of the charging module will be described hereafter.

Before the detail description, some terms in the detail description, such as "port" and "terminal", are the example of the preferred embodiment, and will not restrict the scope of the invention. The battery module is a single electricity box. The charging modules, including the main charging module and the balance charging module, have a plurality of rooms for installation of the battery modules. The battery module may be a portable electricity storage, or any type of electricity storage applied to single box. The following description only describes the charging modules with a room for example.

Figure 1A:
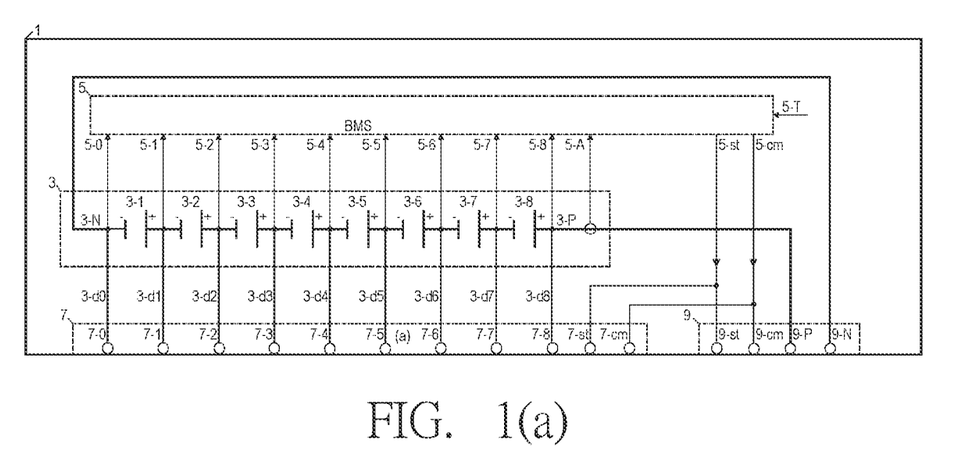
FIG. 1(a) is a circuit diagram of the battery module of a preferred embodiment of the present invention, showing the battery pack having eight cells.
Figure 1B:
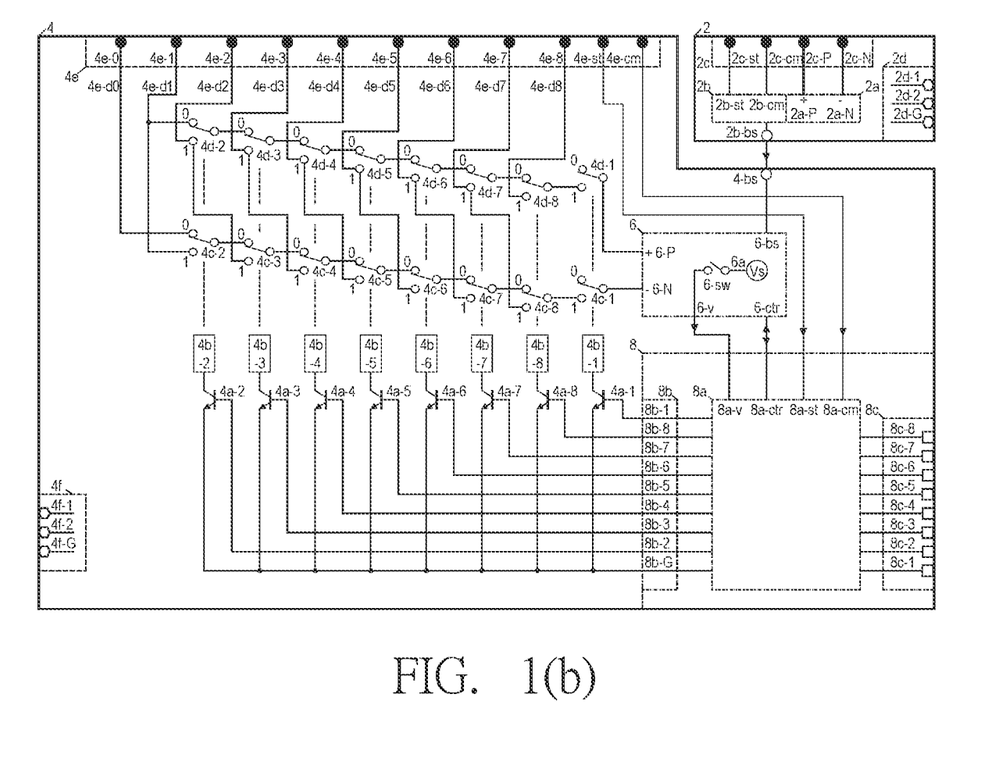
FIG. 1(b) is a circuit diagram of the preferred embodiment of the present invention, showing the main charging module and the balance charging module.

As shown in FIGS. 1(a) and 1(b), the preferred embodiment of the present invention provides a battery module 1, having a battery pack 3, a battery management system (BMS) 5, a battery main socket 9 and a cell socket 7.

The battery pack 3 has s cells, s>1. In the present preferred embodiment, the battery pack 3 has eight (8) cells 3-1, 3-2 . . . , 3-8 in series connection. A negative electrode of the cell 3-1 also is a main negative electrode 3-N(N: Negative) of the battery pack 3. A positive electrode of the cell 3-1 is connected to a negative electrode of the cell 3-2, and a positive electrode of the cell 3-2 is connected to a negative electrode of the cell 3-3, repeated until a positive electrode of the cell 3-7 is connected to a negative electrode of the cell 3-8, and the positive electrode of the cell 3-8 also is a main positive electrode 3-P (P: Positive) of the battery pack 3. A main charging current sensor (not shown) is connected to the negative electrode 3-P or the negative electrode 3-N of the battery pack 3. At least one temperature sensor (not shown) is provided to sense a temperature of the battery pack 3.

The BMS 5 samples a voltage of the battery pack 3, a voltage of each cell 3-1 to 3-8, a charging current, and a temperature of the battery pack 3, and the sampling results are sent to the main charging module 2 and balance charging module 4 through a battery communication port 5-cm and a battery status port 5-st.

The battery main socket 9 has a main positive terminal 9-P, a main negative terminal 9-N, a battery communication terminal 9-cm, and a battery status terminal 9-st.

The cell socket 7 has nine (9) cell terminals 7-0, 7-1 . . . , 7-8, a battery communication terminal 7-cm, and a battery status terminal 7-st.

The connection of the elements of the battery module 1 includes:

Nine (9) cell voltage sampling lines 5-0, 5-1 . . . , 5-8 of the BMS 5 are electrically connected to the nine electrodes of the cells 3-1 to 3-8 of the battery pack 3 to sample the voltage of the battery pack 3 and the voltages of the cells 3-1 to 3-8, respectively. The cell voltage sampling line 5-0 is electrically connected to the negative electrode of the cell 3-1, and the rest cell voltage sampling lines 5-1 to 5-8 are electrically connected to the positive electrodes of the cells 3-1 to 3-8 respectively. A main current sampling line 5-A is provided to sample a charging current. At least one temperature sampling line 5-T is provided to sample a temperature of the battery pack 3. The battery communication port 5-cm and the battery status port 5-st of the BMS 5 are electrically connected to the battery communication terminal 9-cm and the battery status terminal 9-st of the cell socket 9 and the battery communication terminal 7-cm and the battery status terminal 7-st of the cell socket 7, respectively.

Figure 3:
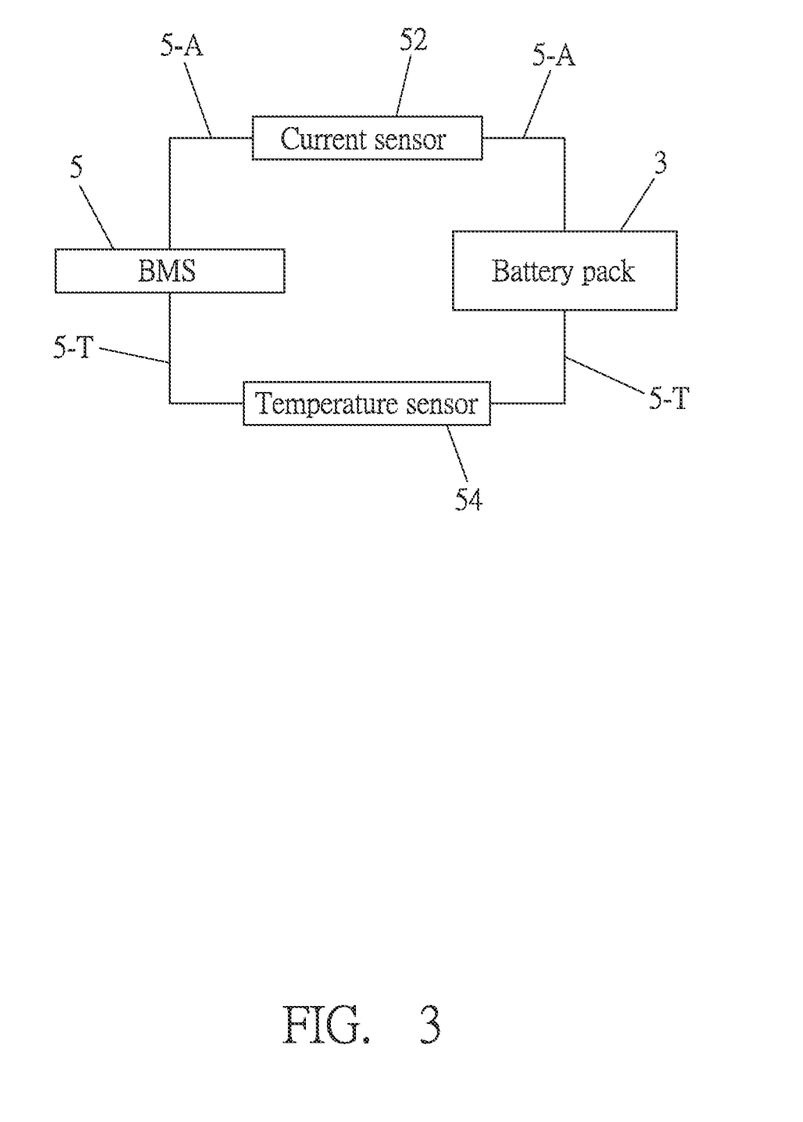
FIG. 3 is a block diagram of the preferred embodiment of the present invention, showing the electric connection of the battery pack, the BMS, the current sensor, and the temperature sensor.

As shown in FIG. 3, the main current sampling line 5-A has opposite ends electrically connected to an output terminal of a current sensor 52 and the BMS 5 respectively. Another main current sampling line 5-A has opposite ends electrically connected to an input terminal of the current sensor 52 and the positive electrode (or the main negative electrode) of the battery pack 3. The temperature sampling line 5-T has opposite ends electrically connected to a temperature sensor 52 and the BMS 5 respectively. Another temperature sampling line 5-T has opposite ends electrically connected to the temperature sensor 52 and the main negative electrode (or the main positive electrode) of the battery pack 3. The temperature sensor 52 may use a thermocouple or a thermistor. The thermocouple (or the thermistor) may be mounted in the battery pack 3 and connected to the electrode by a screw.

The main positive electrode 3-P of the battery pack 3 is electrically connected to the positive terminal 9-P of the battery socket 9, and the main negative electrode 3-N of the battery pack 3 is electrically connected to the main negative terminal 9-N of the battery socket 9.

The battery pack 3 has nine (9) balance charging lines 3-d0, 3-d1 . . . , 3-d8, which are electrically connected to the cell terminals 7-0 to 7-8 of the cell socket 7 respectively. Precisely, the balance charging line 3-d0 is electrically connected to a negative electrode of the cell 3-1, and the balance charging lines 3-d1 to 3-d8 are electrically connected to positive electrodes of the cells 3-2 to 3-8.

A main charging module 2 includes a main charger 2a, a main charging microcontroller 2b, a main charging plug 2c, and a main charging AC connector 2d.

The main charger 2a has a main charging positive electrode 2a-P and a main charging negative electrode 2a-N.

The main charging microcontroller 2b has a main charging communication port 2b-cm, a main charging battery status port 2b-st, and a balance start output terminal 2b-bs (bs: balance start). The balance start output terminal 2b-bs provides a voltage to start a balance charger for balance charging after the main charger 2a completes the charging task.

The main charging plug 2c has a main charging positive terminal 2c-P, a main charging negative terminal 2c-N, a main charging communication terminal 2c-cm, and a main charging battery status terminal 2c-st.

The main charging AC connector 2d is shown as a single-phase connector, having two AC terminals 2d-1 and 2d-2 and a ground terminal 2d-G (G: ground).

Hereafter is the connection of the main charging module 2:

The main charging positive electrode 2a-P and the main charging negative electrode 2a-N of the main charger 2a are electrically connected to the main charging positive terminal 2c-P and the main charging negative terminal 2c-N of the main charging plug 2c respectively.

The main charging communication port 2b-cm and the main charging battery status port 2b-st of the main charging microcontroller 2b are electrically connected to the main charging communication terminal 2c-cm and the main charging battery status terminal 2c-st of the main charging plug 2c.

A balance charging module 4 has a balance charger 6, a balance charging controller 8, a relay set having a plurality of relays 4b-1, 4b-2 . . . , 4b-8, a plurality of cell charging lines 4e-d0, 4e-d1 . . . , 4e-d8, a balance charging plug 4e, and a balance charging AC connector 4f.

The balance charger 6 has a balance charging positive electrode 6-P, a balance charging negative electrode 6-N, a balance charging signal input port 6-bs, a balance charging control port 6-ctr (ctr: control), a working voltage source 6a (Vs: voltage source), a working voltage output port 6-v (v: voltage), and a working voltage switch 6-sw (sw: switch).

The balance charging controller 8 is applied to control the balance charging task, having a balance charging microcontroller 8a, a relay driving signal set 8b, and a cell balance charging status display set 8c.

The balance charging microcontroller 8a has a balance charging communication port 8a-cm, a balance charging battery status port 8a-st, a working voltage input port 8a-v, and a balance charging control port 8a-ctr (ctr: control). The balance charging control port 8a-ctr has a ground line and two signal lines for signal transmission and receiving.

The relay driving signal set 8b has eight (8) driving signal lines 8b-1, 8b-2 . . . , 8b-8 and a ground line 8b-G for driving the relays 4b-1 to 4b-8.

The cell balance charging status display set 8c includes eight (8) displays 8c-1, 8c-2 . . . , 8c-8, for example LEDs, to show voltages of the cells 3-1 to 3-8 in the balance charging task for user to monitor the balance of the cells 3-1 to 3-8.

The replay set includes eight (8) relays 4b-1, 4b-2 . . . , 4b-8 to electrically connect relay contacts 4c-1, 4c-2 . . . , 4c-8 and relay contacts 4d-1, 4d-2 . . . , 4d-8 to the balance charging positive electrode 6-P and the balance charging negative electrode 6-N of the balance charger 6 under control.

The balance charging plug 4e has nine (9) cell charging terminals 4e-0, 4e-1 . . . , 4e-8, a balance charging communication terminal 4e-cm, and a balance charging battery status terminal 4e-st.

Nine (9) cell charging lines 4e-d0, 4e-d1. 4e-d8 electrically connects the relay contacts to the cell charging terminals 4e-0 to 4e-8 of the balance charging plug 4e.

The balance charging AC connector 4f is shown as a single phase connector, having two AC terminals 4f-1 and 4f-2 and a ground terminal 4f-G. An AC power source is supplied to the balance charger 6.

Hereafter is the connection of the balance charging module 4:

The balance charging signal input port 6-bs provides a voltage to the balance start output terminal 2b-bs of the main charging module 2 after the main charging task, and automatically connects a voltage Vs of the working voltage source 6a to the working voltage output port 6-v, and then connects to the working voltage input port 8a-v of the balance charging microcontroller 8a to provide the balance charging microcontroller 8a necessary working voltage.

The working voltage switch 6-sw is used to manually connect the voltage Vs of the working voltage source 6a to the working voltage output port 6-v in a condition of without the balance charging module 4 to proceed the balance charging task without the balance charging module 4.

The balance charging positive electrode 6-P and the balance charging negative electrode 6-N balance charger 6 are electrically connected to the relay contact 4d-1 (main contact) and the replay contact 4c-1 (main contact) of the relay 4b-1.

As shown in FIG. 1, the balance charging microcontroller 8a is electrically connected to the cell charging lines 4e-d0 to 4e-d8 through the relay driving signal set 8b, relay driving members 4a-1, 4a-2 . . . , 4a-8, the relay set 4b-1 to 4b-8, the relay contacts 4c-1 to 4c-8 and 4d-1 to 4c-8 respectively.

Hereafter is a method of charging the battery pack 3 of the preferred embodiment.

1. Main Charging Mode:

In the main charging mode, the main charging plug 2c of the main charging module 2 is connected to the battery main socket 9 of the battery module 1. The main positive terminal 9-P, the main negative terminal 9-N, the battery communication terminal 9-cm and the battery status terminal 9-st of the battery main socket 9 are electrically connected to the main charging positive terminal 2c-P, the main charging negative terminal 2c-N, the main charging communication terminal 2c-cm and the main charging battery status terminal 2c-st of the main charging plug 2c to electrically connect the main positive terminal 9-P and the main negative terminal 9-N of the battery main socket 9 to the main charging positive terminal 2c-P and the main charging negative terminal 2c-N of the main charging plug 2c, and to connect the battery communication terminal 9-cm and the battery status terminal 9-st of the battery main socket 9 to the main charging communication terminal 2c-cm and the main charging battery status terminal 2c-st of the main charging plug 2c, respectively.

As a result, the main charger 2a may charge the cells 3-1 to 3-8 of the battery pack 3 (with high current) when the AC power source is supplied to the main charging module 2. At the same time, the BMS 5 senses real time data of the battery pack 3, such as voltage, current, and temperature, and transmit the data to the main charging microcontroller 2b through the battery communication port 5-cm, the battery communication port 9-cm, the main charging communication terminal 2c-cm and the main charging communication port 2*b-cm*. The BMS 5 senses an error signal, such as any cell exceeding the maximum charging voltage, the maximum charging current or the maximum temperature, or damaged cell in the charging task, and transmits the error signal to the main charging microcontroller 2*b* through the battery status port 5-*st*, the battery status port 9-*st*, the main charging battery status terminal 2*c-st* and the main charging battery status port 2*b-st*. The main charging microcontroller 2*b* sends the main charger 2*a* a control signal after receiving the error signal to stop the charging task.

The main charging microcontroller 2*b* sends the balance start output terminal 2*b-bs* a voltage when the charging task is completed normally.

2. Balance Charging Mode:

In the balance charging mode, the balance charging plug 4*e* of the balance charging module is electrically connected to the cell socket 7 of the battery module 1. The balance charging module 4 has a balance charging signal input terminal 4-*bs* electrically connected to the balance start output terminal 2*b-bs* of the main charging module 2 when the main charging task is combined with the balance charging task. This connection is skipped when no balance charging task is applied in the main charging task.

The cell terminals 7-0 to 7-8, the battery communication terminal 7-*cm* and the battery status terminal 7-*st* of the cell socket 7 are electrically connected to the cell charging terminals 4*e*-0 to 4*e*-8, the balance charging communication terminal 4*e-cm* and the balance charging battery status terminal 4*e-st* of the balance charging plug 4*e* after the balance charging plug 4*e* is connected to the cell socket 7 that electrically connects the electrodes of the cells of the battery pack 3 of the battery module 1 to the cell charging terminals 4*e*-0 to 4*e*-8 of the balance charging plug 4*e* through the cell terminals 7-0 to 7-8 of the cell socket 7. It also electrically connects the battery communication terminal 7-*cm* and the battery status terminal 7-*st* of the cell socket 7 to the balance charging communication terminal 4*e-cm* and the balance charging battery status terminal 4*e-st* of the balance charging plug 4*e*.

The cell charging terminals 4*e*-0 to 4*e*-8, the balance charging communication terminal 4*e-cm* and the balance charging battery status terminal 4*e-st* of the balance charging plug 4*e* are electrically connected to the contacts of the relays through the cell charging lines 4*e-d*0 to 4*e-d*8.

Hereafter is the procedure of the balance charging when the AC power source is connected to the balance charging AC connector 4*f* of the balance charging module 4.

The AC power is transmitted to the balance charger 6 from the balance charging AC connector 4*f* to generate a DC working voltage source 6*a* with a predetermined voltage Vs.

In the condition of balance charging module 4 working with the main charging module 2, the main charging microcontroller 2*b* sends the balance start output terminal 2*b-bs* a voltage when the main charging task is completed. The balance start output terminal 2*b-bs* is electrically connected to the balance charging signal input terminal 4-*bs* of the balance charging module 4, and then the voltage from the main charging microcontroller 2*b* is sent to the balance charging signal input port 6-*bs* of the balance charger 6 to drive a circuit in the balance charger 6 and send the voltage Vs of the working voltage source 6*a* to the working voltage output port 6-*v*.

In the condition of the main charging module 2 working without the balance charging module 4, it may turn the working voltage switch 6-*sw* of the balance charger 6 on to send the voltage Vs of the working voltage source 6*a* to the working voltage output port 6-*v*.

The working voltage output port 6-*v* then is electrically connected to the working voltage input port 8*a-v* of the balance charging microcontroller 8*a* to provide the balance charging microcontroller 8*a* the necessary working voltage.

Next, the balance charging communication terminal 4*e-cm* of the balance charging plug 4*e* is electrically connected to the balance charging communication port 8*a-cm* of the balance charging microcontroller 8*a*. therefore, the balance charging microcontroller 8*a* may obtain a number of the cells of the battery pack 3. In the present preferred embodiment, the number of the cells is eight (8).

Next, the balance charging battery status terminal 4*e-st* of the balance charging plug 4*e* is electrically connected to the balance charging battery status port 8*a-st* of the balance charging microcontroller 8*a*, so that the balance charging microcontroller 8*a* may obtain a current status of the battery pack 3 of the battery module 1. The balance charging control port 8*a-ctr* of the balance charging microcontroller 8*a* send the balance charging control port 6-*ctr* of the balance charger 6 a control voltage when the battery pack 3 is well-functional.

Next, the balance charger 6 generates a balance charging voltage according to the control voltage of the balance charging control port 6-*ctr*, and then connects the positive electrode to the balance charging positive electrode 6-P of the balance charger 6 and connects the negative electrode to the balance charging negative electrode 6-N of the balance charger 6. The positive and the negative electrodes 6-P and 6-N are electrically connected to the main contacts 4*d*-1 and 4*c*-1, which are controlled by the relay 4*b*-1 of the balance charging module 4. In order to understanding, the relay set is described as main contact.

Next, the main contacts 4*c*-1 to 4*c*-8 and 4*d*-1 to 4*d*-8 shown in FIG. 1 are connected to a predetermined position labeled as 0, in which the relays are not activated. For easy understanding, they are labeled as (4*c*-1→0), (4*c*-2→0) . . . , (4*c*-8→0) and (4*d*-1→0), (4*d*-2→0) . . . , (4*d*-8→0).

Next, the main contact of the relay is switched to a position labeled as 1 when the relay is activated. The same as above, they are labeled as (4*c*-1→1), (4*c*-2→1) . . . , (4*c*-8→1) and (4*d*-1→1), (4*d*-2→1) . . . , (4*d*-8→1).

Next, the balance charging microcontroller 8*a* sends the relay driving signal set 8*b* a driving voltage via the driving signal line 8*b*-1 at the same time of the balance charging control port 8*a-ctr* of the balance charging microcontroller 8*a* sending the balance charging control port 6-*ctr* of the balance charger 6 the control voltage. It is noted that no driving voltage is sent to the driving signal lines 8*b*-2 to 8*b*-8 of the relay driving signal set 8*b*. as a result, the driving voltage is sent to the relay driving members 4*a*-1 (it is shown as a transistor in FIG. 1, and it may be a MOSFET instead) to activate the relay 4*b*-1, so that the main contacts 4*d*-1 and 4*c*-1 are switch to 1 from 0. In other words, the balance charging positive electrode 6-P and the balance charging negative electrode 6-N of the balance charger 6 are connected to the contacts 1 through the main contacts 4*d*-1 and 4*c*-1. It is shown as (6-P)→(4*d*-1→1) and (6-N)→(4*c*-1→1).

As shown in FIG. 1, the connections of the relay contacts after the relay 4*b*-1 is activated are: (6-P)→(4*d*-1→1)→(4*d*-8→0)→(4*d*-7→0)→ . . . →(4*d*-2→0)→(4*e-d*1)→(4*e*-1)→the cell terminal 7-1 of the cell socket 7→(3-*d*1)→the positive electrode of the cell 3-1, and (6-N)→(4*c*-1→1)→(4*c*-8→0)→(4*c*-7→0)→ . . . →(4*c*-2→0)→(4*e-d*0)→(4*e*-0)→the cell terminal 7-0 of the cell socket 7→(3-*d*0)→the negative electrode of the cell 3-1. In other words, the balance charger 6 charges the cell 3-1. In the meantime, the balance charging microcontroller 8a sends the display 8c-1 of the cell balance charging status display set 8c a signal to show the cell 3-1 is been charged, for example, the display 8c-1 shows green flash.

The balance charger 6 stops to charge the cell 3-1 when the cell 3-1 is full. In this time, the balance charging control port 6-*ctr* of the balance charger 6 sends the balance charging control port 8a-*ctr* of the balance charging microcontroller 8a a signal to show the charging task is completed, for example the display 8c-1 shows green light.

Next, the balance charging microcontroller 8a records time of charge as 1, and compares it with the number of the cells of the battery pack 3. It shows that the balance charging task continues if the time of charge is small than the number of the cells. Therefore, the balance charging microcontroller 8a keeps sending the driving signal line 8b-1 of the relay driving signal set 8b a voltage and sends the voltage to the driving signal line 8b-2 as well to activate the relay 4b-2. In this time, the relays 4b-1 and 4b-2 are activated the connection of the balance charging is: (6-P)→(4d-1→1)→(4d-8→0)→(4d-7→0)→ . . . →(4d-2→1)→(4e-d2)→(4e-2)→the cell terminal 7-2 of the cell socket 7→(3-d2)→the positive electrode of the cell 3-2, and (6-N)→(4c-1→1)→(4c-8→0)→(4c-7→0)→ . . . →(4c-2→1)→(4e-d1)→(4e-1)→the cell terminal 7-1 of the cell socket 7→(3-d1)→the negative electrode of the cell 3-2. In other words, the balance charger 6 charges the cell 3-2. In the meantime, the balance charging microcontroller 8a sends the display 8c-2 of the cell balance charging status display set 8c a signal to show the cell 3-2 is been charged, for example, the display 8c-2 shows green flash, and the display 8c-2 shows green light.

The balance charger 6 stops to charge the cell 3-2 when the cell 3-2 is full. In this time, the balance charging control port 6-*ctr* of the balance charger 6 sends the balance charging control port 8a-*ctr* of the balance charging microcontroller 8a a signal, and then the balance charging microcontroller 8a sends the display 8c-2 another signal to show the charging task is completed, for example the display 8c-2 shows green light. In other words, both the displays 8c-1 and 8c-2 show green light.

Next, the balance charging microcontroller 8a records time of charge as 2, and compares it with the number of the cells of the battery pack 3. It shows that the balance charging task continues because the time of charge still is small than the number of the cells. Therefore, the balance charging microcontroller 8a keeps sending the driving signal line 8b-1 of the relay driving signal set 8b a voltage and sends the voltage to the driving signal line 8b-3 as well to activate the relay 4b-3. In this time, the relays 4b-1 and 4b-3 are activated the connection of the balance charging is: (6-P)→(4d-1→1)→(4d-8→0)→(4d-7→0)→ . . . →(4d-3→1)→(4e-d3)→(4e-3)→the cell terminal 7-3 of the cell socket 7→(3-d3)→the positive electrode of the cell 3-3, and (6-N)→(4c-1→1)→(4c-8→0)→(4c-7→0)→ . . . →(4c-3→1)→(4e-d2)→(4e-2)→the cell terminal 7-2 of the cell socket 7→(3-d2)→the negative electrode of the cell 3-3.

With the process as described above, the balance charger 6 charges the cell 3-3. In the meantime, the balance charging microcontroller 8a sends the display 8c-3 of the cell balance charging status display set 8c a signal to show the cell 3-3 is been charged, for example, the display 8c-3 shows green flash while the displays 8c-1 and 8c-2 show green light.

The balance charger 6 stops to charge the cell 3-3 when the cell 3-3 is full. In this time, the balance charging control port 6-*ctr* of the balance charger 6 sends the balance charging control port 8a-*ctr* of the balance charging microcontroller 8a a signal, and then the balance charging microcontroller 8a sends the display 8c-3 another signal to show the charging task is completed, for example the display 8c-3 shows green light. In other words, both the displays 8c-1, 8c-2 and 8c-3 show green light.

The balance charging microcontroller 8a records time of charge as 3, and compares it with the number of the cells of the battery pack 3. It shows that the balance charging task continues because the time of charge still is small than the number of the cells. Therefore, the balance charging microcontroller 8a keeps sending the driving signal line 8b-1 of the relay driving signal set 8b a voltage and sends the voltage to the driving signal line 8b-4 as well to activate the relay 4b-4 (the relay 4b-1 still is activated), and the cell 3-4 is been charged.

Repeat the process as described above to charge the cells 3-4 to 3-8 in sequence. In the time of charging the cell 3-8, the balance charging microcontroller 8a keeps sending the driving signal line 8b-1 of the relay driving signal set 8b a voltage and sends the voltage to the driving signal line 8b-8 as well to activate the relay 4b-8. In this time, the relays 4b-1 and 4b-8 are activated the connection of the balance charging is: (6-P)→(4d-1→1)→(4d-8→1)→(4e-d8)→(4e-8)→the positive electrode of the cell 3-8, and (6-N)→(4c-1→1)→(4c-8→1)→(4e-d7)→(4e-7)→the cell terminal 7-7 of the cell socket 7→the negative electrode of the cell 3-8.

With the process as described above, the balance charger 6 charges the cell 3-8. In the meantime, the balance charging microcontroller 8a sends the display 8c-8 of the cell balance charging status display set 8c a signal to show the cell 3-8 is been charged, for example, the display 8c-8 shows green flash while the displays 8c-1 to 8c-7 show green light.

The balance charger 6 stops to charge the cell 3-8 when the cell 3-8 is full. In this time, the balance charging control port 6-*ctr* of the balance charger 6 sends the balance charging control port 8a-*ctr* of the balance charging microcontroller 8a a signal, and then the balance charging microcontroller 8a sends the display 8c-8 another signal to show the charging task is completed, for example the display 8c-8 shows green light. In other words, all the displays 8c-1 to 8c-8 show green light.

The balance charging microcontroller 8a records time of charge as 3, and compares it with the number of the cells of the battery pack 3. It shows that the balance charging task completed because the time of charge is equal to the number of the cells.

After the balance charging task, the voltages of all the cells 3-1 to 3-8 are absolute balance since every cell 3-1 to 3-8 is charged by the same charger, i.e. the balance charger 6.

Above is one of the embodiments of the present invention which charge the battery pack with 8 cells. In practice, the number of the cells of the battery pack is not restricted, any battery pack with the cells more than 8 or less than 8 could be applied to the present invention.

In an embodiment, the charge cut-off voltage of the cell is 4.25V, the charge current of the main charger 2a is 20 A, and the charge current of the balance charger 6 is 2 A. The maximum charging power of the main charger 2a is 4.25V×8×20 A=680 W. The maximum charging power of the balance charger 6 is 4.25V×1×2 A=8.5 W, which is 1.25% of the maximum charging power of the main charger 2a. the charging power is like the power of phone charger. It is practice.

Figure 2:
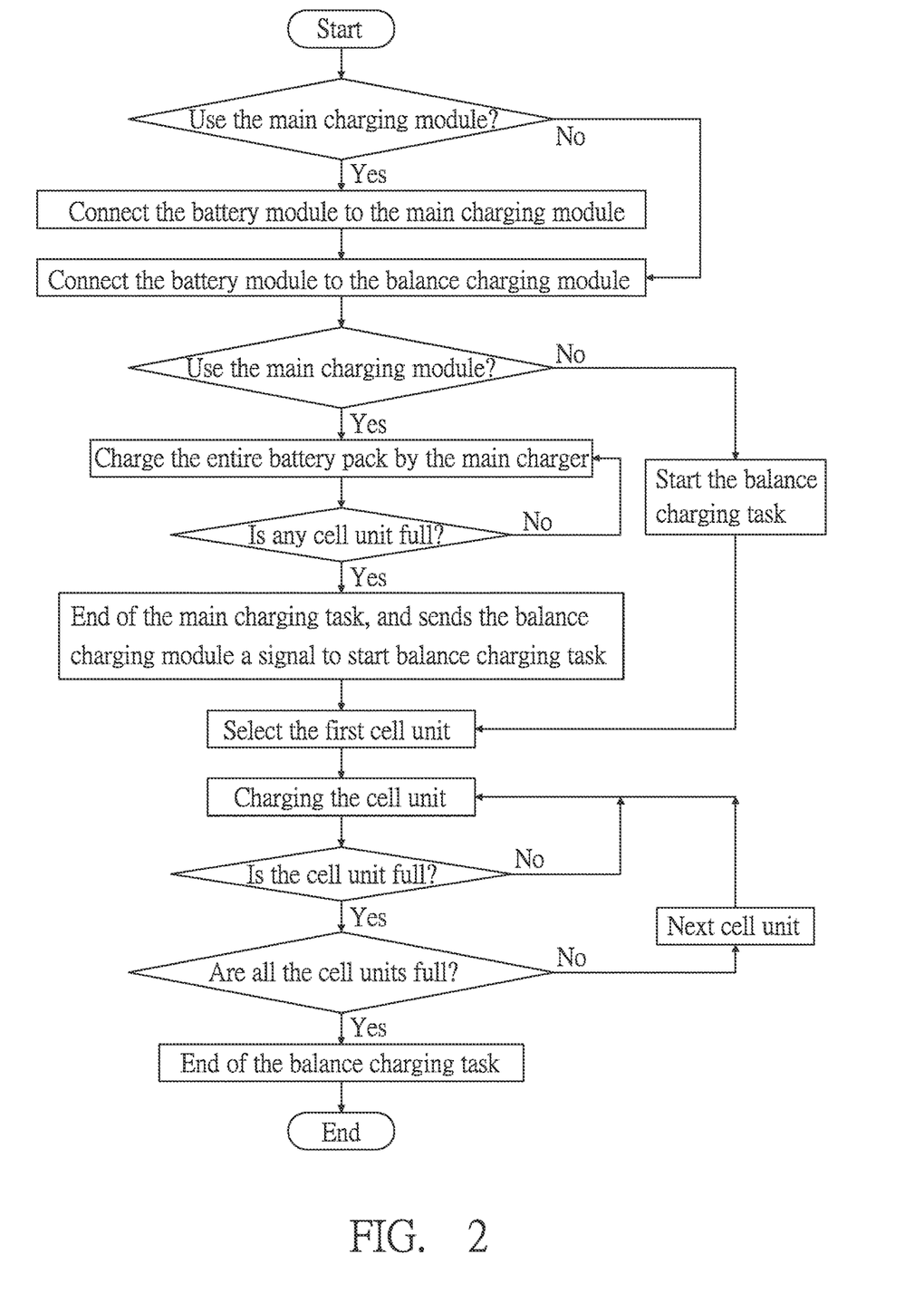
FIG. 2 is a flow chart of the charging method of the preferred embodiment of the present invention.

As shown in FIG. 2, a method of charging the battery pack includes the following steps:

Connect a battery module to a main charging module and a balance charging module. The battery module has a socket (main socket) to be connected to a plug (main plug) of the main charging module, and a plug (balance charging plug) of the balance charging module is connected to another socket (cell socket) of the battery module. The main charging module is selectable to work with or without the balance charging module. The main charging module and the balance charging module may be mounted in a case or separated.

Charge the cells of the battery pack of the battery module at the same time by the main charger, and then charge the cells of the battery pack of the battery module in sequence by the balance charging module.

The main charger stops to charge the battery pack when any one of the cells reaches a predetermined charge cut-off value (it means that the cell is full). At the moment of stop charging, voltages of the cells are slightly lower than the predetermined charge cut-off value.

The balance charging module will receive a signal when the main charger stops charging, and then the balance charging module starts to charge the cells of the battery pack of the battery module one by one until all the cells reach the predetermined charge cut-off value. The charging process is completed.

As shown in FIG. 2, a method of charging the battery pack includes a step of a selecting a charging mode between a combination charging mode and a balance charging mode. In the combination charging mode, all the cells of the battery pack of the battery module are charged at the same time by the main charger of the main charging module until any one of the cells is full, and then the cells of the battery pack of the battery module are charged in sequence by the balance charger of the balance charging module after the main charger stops charging the battery pack. The charging task is completed when all the cells are full. In the balance charging mode, the cells of the battery pack of the battery module are charged in sequence by the balance charger of the balance charging module.

It must be pointed out that the embodiments described above are only some preferred embodiments of the present invention. All equivalent structures which employ the concepts disclosed in this specification and the appended claims should fall within the scope of the present invention.

What is claimed is:

1. A system of charging a battery pack, comprises:
  a battery module including a battery pack, a battery management system, a cell socket, and a battery main socket;
  wherein the battery pack has a plurality of cells in series, a main positive electrode, and a main negative electrode; each of the cells has two electrodes;
  wherein the battery management system has a battery communication port and a battery status port; the battery management system is electrically connected to the electrodes of the cells of the battery pack through a plurality of cell voltage sampling lines;
  wherein the cell socket includes a plurality of cell terminals, a battery communication terminal, and a battery status terminal; the cell terminals of the cell socket are electrically connected to the electrodes of the cells of the battery pack respectively;
  wherein the battery main socket has a main positive terminal and a main negative terminal, and the main positive terminal and the main negative terminal of the battery main socket are electrically connected to the main positive electrode and the main negative electrode of the battery pack respectively; the battery main socket further has a battery communication terminal and a battery status terminal;
  wherein the battery communication terminal of the cell socket and the battery communication terminal of the battery main socket are electrically connected to the battery communication port of the battery management system; the battery status terminal of the cell socket and the battery status terminal of the battery main socket are electrically connected to the battery status port of the battery management system;
  a main charging module including a main charger, a main charging microcontroller, a main charging plug, and a main charging AC connector;
  wherein the main charger has a main charging positive electrode and a main charging negative electrode;
  wherein the main charging microcontroller has a main charging communication port, a main charging battery status port, and a balance start output terminal;
  wherein the main charging plug has a main charging positive terminal, a main charging negative terminal, a main charging communication terminal, and a main charging battery status terminal; the main charging positive terminal of the main charging plug is electrically connected to the main charging positive electrode of the main charger, and the main charging negative terminal of the main charging plug is electrically connected to the main charging negative electrode of the main charger; the main charging communication terminal of the main charging plug is electrically connected to the main charging communication port of the main charger, and the main charging battery status terminal of the main charging plug is electrically connected to the main charging battery status port of the main charger;
  wherein the main charging AC connector is connected to a power source to supply the main charger and the main charging microcontroller with power;
  wherein the main charging positive terminal, the main charging negative terminal, the main charging communication terminal, and the main charging battery status terminal of the main charging plug are electrically connected to the main positive terminal, the main negative terminal, the battery communication terminal, and the battery status terminal of the battery main socket respectively; and
  a balance charging module including a balance charger, a balance charging controller, a relay set, a plurality of cell charging lines, and a balance charging plug;
  wherein the balance charging plug has a plurality of cell charging terminals, a balance charging communication terminal, and a balance charging battery status terminal; the relay set has a plurality of relays with relay contacts; the cell charging terminals of the balance charging plug are electrically connected to the relay contacts respectively;
  wherein the balance charger has a balance charging positive electrode, a balance charging negative electrode, a balance charging signal input port, a balance charging control port, a working voltage source, a working voltage output port, and a working voltage switch; the balance charging positive electrode and the balance charging negative electrode are electrically connected to two of the relay contacts; the balance charging signal input port is electrically connected to the balance start output terminal of the main charging microcontroller; the working voltage source and the working voltage output port are electrically connected to the working voltage switch;

wherein the balance charging controller has a balance charging microcontroller, a relay driving signal set, and a cell balance charging status display set;

wherein the balance charging microcontroller is electrically connected to the relay driving signal set and the cell balance charging status display set; the balance charging microcontroller has a working voltage input port, which is electrically connected to the working voltage output port of the balance charger; the balance charging microcontroller further has a balance charging control port, which is electrically connected to the balance charging control port of the balance charger; the balance charging microcontroller further has a balance charging battery status port and a balance charging communication port, which are electrically connected to the balance charging battery status port and the balance charging communication port of the balance charging plug respectively.

2. The system of claim 1, wherein main charging module has a main charging AC connector, and the balance charging module has a balance charging AC connector; both the balance charging AC connectors of the main charging module and the balance charging module are electrically connected to the battery pack to supply power to the battery pack from the power source.

3. The system of claim 1, further comprising a main charging current sensor and a main charging current sampling line, wherein the main charging current sensor is electrically connected to the main positive electrode or the main negative electrode to sense current, and the main charging current sampling line is electrically connected to the current sensor and the battery management system.

* * * * *